(12) United States Patent
Wei

(10) Patent No.: US 11,609,385 B2
(45) Date of Patent: Mar. 21, 2023

(54) FIBER OPTIC ADAPTER

(71) Applicant: Amphenol Fiber Optic Technology (Shenzhen) Co., Ltd., Shenzhen (CN)

(72) Inventor: Aerik Wei, Shenzhen (CN)

(73) Assignee: AMPHENOL FIBER OPTIC TECHNOLGY (SHENZHEN) CO., LTD., Shenzhen (CN)

(*) Notice: Subject to any disclaimer, the term of this patent is extended or adjusted under 35 U.S.C. 154(b) by 47 days.

(21) Appl. No.: 17/485,979

(22) Filed: Sep. 27, 2021

(65) Prior Publication Data

US 2023/0008599 A1 Jan. 12, 2023

(30) Foreign Application Priority Data

Jul. 6, 2021 (CN) .......................... 202121530399.6

(51) Int. Cl.
*G02B 6/38* (2006.01)
(52) U.S. Cl.
CPC ................................. *G02B 6/3825* (2013.01)
(58) Field of Classification Search
CPC ..................................................... G02B 6/38
USPC ....................................................... 385/134
See application file for complete search history.

(56) References Cited

U.S. PATENT DOCUMENTS

| | | | | |
|---|---|---|---|---|
| 7,972,066 B1* | 7/2011 | Lin | ....................... | G02B 6/3825 385/53 |
| 8,821,031 B2* | 9/2014 | Lin | ....................... | G02B 6/3849 385/59 |
| 8,870,466 B2* | 10/2014 | Lu | ......................... | G02B 6/3821 385/139 |
| 8,965,166 B2* | 2/2015 | Yang | .................... | G02B 6/3825 385/134 |
| 9,618,715 B1* | 4/2017 | Yang | .................... | G02B 6/3825 |
| 10,502,904 B2* | 12/2019 | Yang | .................. | G02B 6/3825 |
| 11,041,994 B2* | 6/2021 | Liu | ........................ | G02B 6/3825 |
| 2002/0181888 A1* | 12/2002 | Zimmel | ................ | G02B 6/266 385/72 |
| 2003/0147597 A1* | 8/2003 | Duran | .................. | G02B 6/3825 385/76 |
| 2010/0081303 A1* | 4/2010 | Roth | .................... | G02B 6/3817 439/607.03 |

(Continued)

FOREIGN PATENT DOCUMENTS

| | | | | |
|---|---|---|---|---|
| CN | 207965227 U | * | 10/2018 | ........... G02B 6/3817 |
| TW | 480682 U | * | 6/2014 | ........... G02B 6/3893 |

(Continued)

*Primary Examiner* — Kaveh C Kianni
(74) *Attorney, Agent, or Firm* — Muncy, Geissler, Olds & Lowe, P.C.

(57) ABSTRACT

A fiber optic adapter includes: an outer casing that has a plurality of connecting holes, a plurality of installation slots disposed in front of and spatially communicated with the connecting holes, and a plurality of insertion slots disposed behind and spatially communicated with the connecting holes; a position-limiting member that is fixed to the outer casing, and that includes a main plate portion, two side plate portions, a plurality of resilient plate portions disposed obliquely on the main and side plate portions, and a plurality of protruding portions protruding from the main and side plate portions; and a plurality of mounting seats that are inserted removably into the installation slots.

8 Claims, 9 Drawing Sheets

(56) References Cited

U.S. PATENT DOCUMENTS

| | | | |
|---|---|---|---|
| 2010/0239220 A1* | 9/2010 | Lin | G02B 6/3825 |
| | | | 385/134 |
| 2011/0123157 A1* | 5/2011 | Belsan | G02B 6/4292 |
| | | | 439/523 |
| 2012/0321266 A1* | 12/2012 | Lin | G02B 6/3849 |
| | | | 385/134 |
| 2016/0306121 A1* | 10/2016 | Yang | G02B 6/3825 |
| 2016/0370549 A1* | 12/2016 | Yin | G02B 6/4452 |
| 2017/0097485 A1* | 4/2017 | Yang | G02B 6/4296 |
| 2018/0217338 A1* | 8/2018 | Takano | G02B 6/3879 |
| 2019/0331860 A1* | 10/2019 | Yang | G02B 6/3825 |
| 2019/0384017 A1* | 12/2019 | Lu | G02B 6/3893 |

FOREIGN PATENT DOCUMENTS

| | | | | |
|---|---|---|---|---|
| TW | 509353 U | * | 9/2015 | ........... G02B 6/3825 |
| WO | WO-2022037186 A1 | * | 2/2022 | ........... G02B 6/4206 |

* cited by examiner

FIBER OPTIC ADAPTER

CROSS-REFERENCE TO RELATED APPLICATION

This application claims priority of Chinese Patent Application No. 202121530399.6, filed on Jul. 6, 2021.

FIELD

This invention relates to an adapter, and more particularly to an adapter for a fiber optic connector.

BACKGROUND

A conventional fiber optic adapter is configured to interconnect different types of fiber optic connectors via different types of insertion slots that are disposed at its opposite sides, such that these fiber optic connectors are in signal communication with one another. Such conventional fiber optic adapter is often installed to a panel, and since it is usually press fit into the panel, in the course of use, it is easy to be loosened from the panel. This may cause offset or misalignment between the fiber optic connectors that require precision fits, thereby resulting in increased fluctuation of optical performance of the connectors during use.

Furthermore, the number of the insertion slots of the conventional fiber optic adapter is fixed; that is, only a fixed number of the fiber optic connectors can be inserted. If different numbers of the insertion slots are required, the conventional fiber optic adapter has to be re-molded to include the different numbers of the insertion slots, which is not suitable for modularization and difficult for cost reduction.

SUMMARY

Therefore, an object of the disclosure is to provide a fiber optic adapter that can be securely installed to a panel and is suitable for modularization.

According to the disclosure, a fiber optic adapter includes an outer casing, a position-limiting member and a plurality of mounting seats.

The outer casing includes an inner wall portion that is formed with a plurality of connecting holes extending along a front-back direction, a first casing portion that is disposed in front of and connected to the inner wall portion, and that extends along the front-back direction, a second casing portion that is disposed behind and connected to the inner wall portion, and that extends along the front-back direction, and a positioning portion that protrudes outwardly from the second casing portion. The connecting holes are spaced apart from each other in a left-right direction transverse to the front-back direction. The first casing portion and the inner wall portion cooperatively define a plurality of installation slots that are arranged in the left-right direction and that are spatially communicated with the connecting holes, respectively. The second casing portion and the inner wall portion cooperatively define a plurality of insertion slots that are arranged in the left-right direction and that are spatially communicated with the connecting holes, respectively.

The position-limiting member is fixed to the second casing portion, and includes a main plate portion that extends in the left-right direction, two side plate portions that extend respectively from left and right sides of the main plate portion in an up-down direction transverse to the front-back direction and the left-right direction, a plurality of resilient plate portions that are disposed obliquely on the main plate portion and the side plate portions, and a plurality of protruding portions that protrude from the main plate portion and the side plate portions. Each of the resilient plate portions extends in a direction oblique to the front-back direction, and has a first end distal from the positioning portion, and a second end opposite to the first end and proximate to the positioning portion. The first end is connected to a corresponding one of the main plate portion and the side plate portions. The second end is spaced apart from the corresponding one of the main plate portion and the side plate portions in one of the up-down direction and the left-right direction.

The mounting seats are inserted removably into the installation slots. Each of the mounting seats divides a corresponding one of the installation slots into two sockets that are connected correspondingly to two of the connecting holes.

The advantages of the present disclosure reside in the following: the resilient plate portions permit a panel to pass unidirectionally therethrough along the front-back direction, and secure the panel after the panel is sleeved on the second casing portion, such that the panel is fixed between the resilient plate portions and the positioning portion along the front-back direction. Unless a user presses the resilient plate portions, the panel is positioned on the outer casing along the front-back direction, so that the fiber optic adapter is avoided from being loosened and sway relative to the panel. Furthermore, the outer casing may be configured to have different numbers of installation slots as desired, and be mounted respectively to the mounting seats. Hence, even if the outer casing with a larger number of the installation slots are used, a smaller number of the mounting seats can still be used, which is beneficial not only for maintenance and replacement, but for modularization, and the material cost for mold manufacturing can be reduced.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
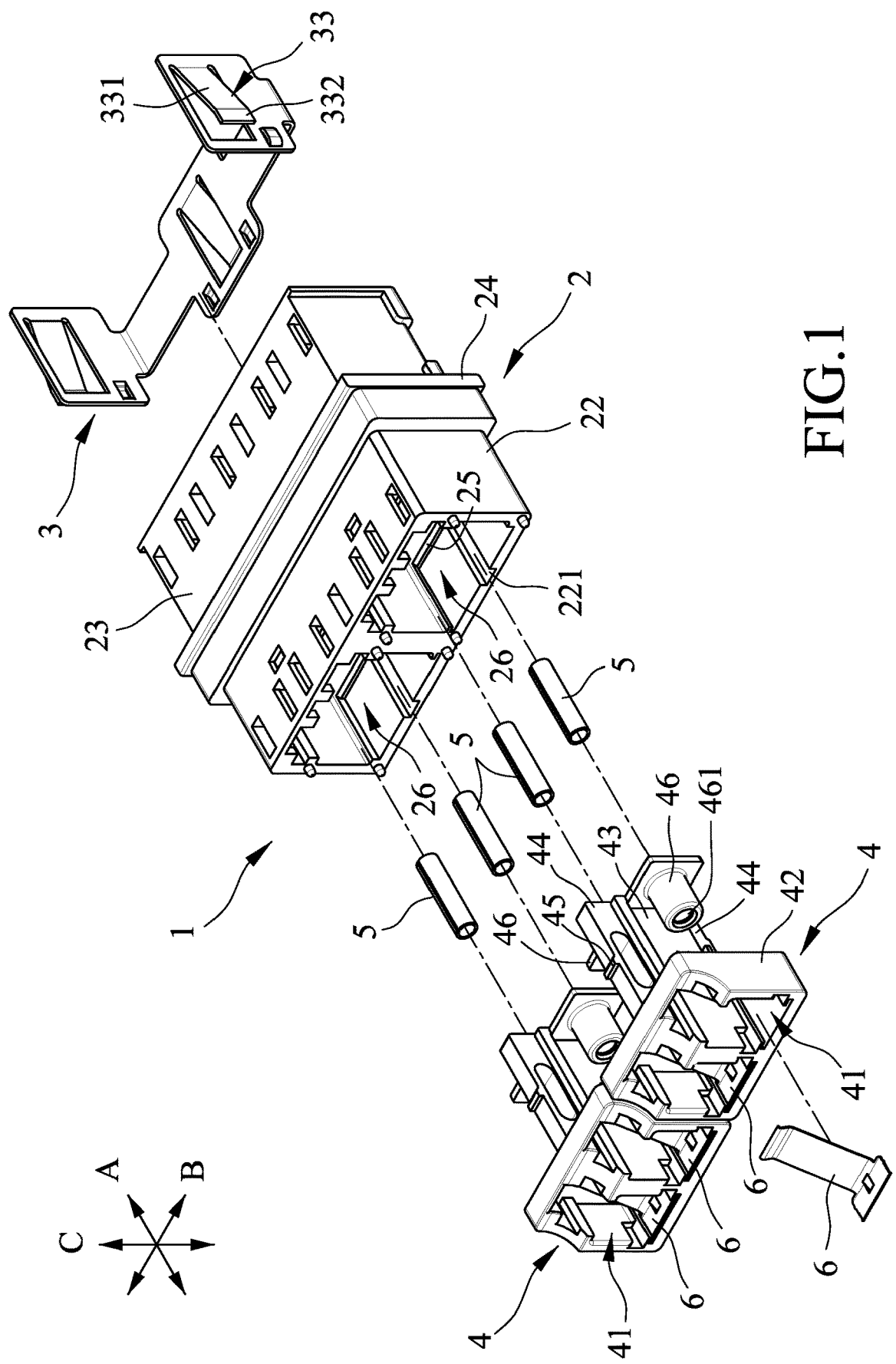
FIG. 1 is an exploded perspective view of an embodiment of a fiber optic adapter according to the disclosure.
Figure 2:
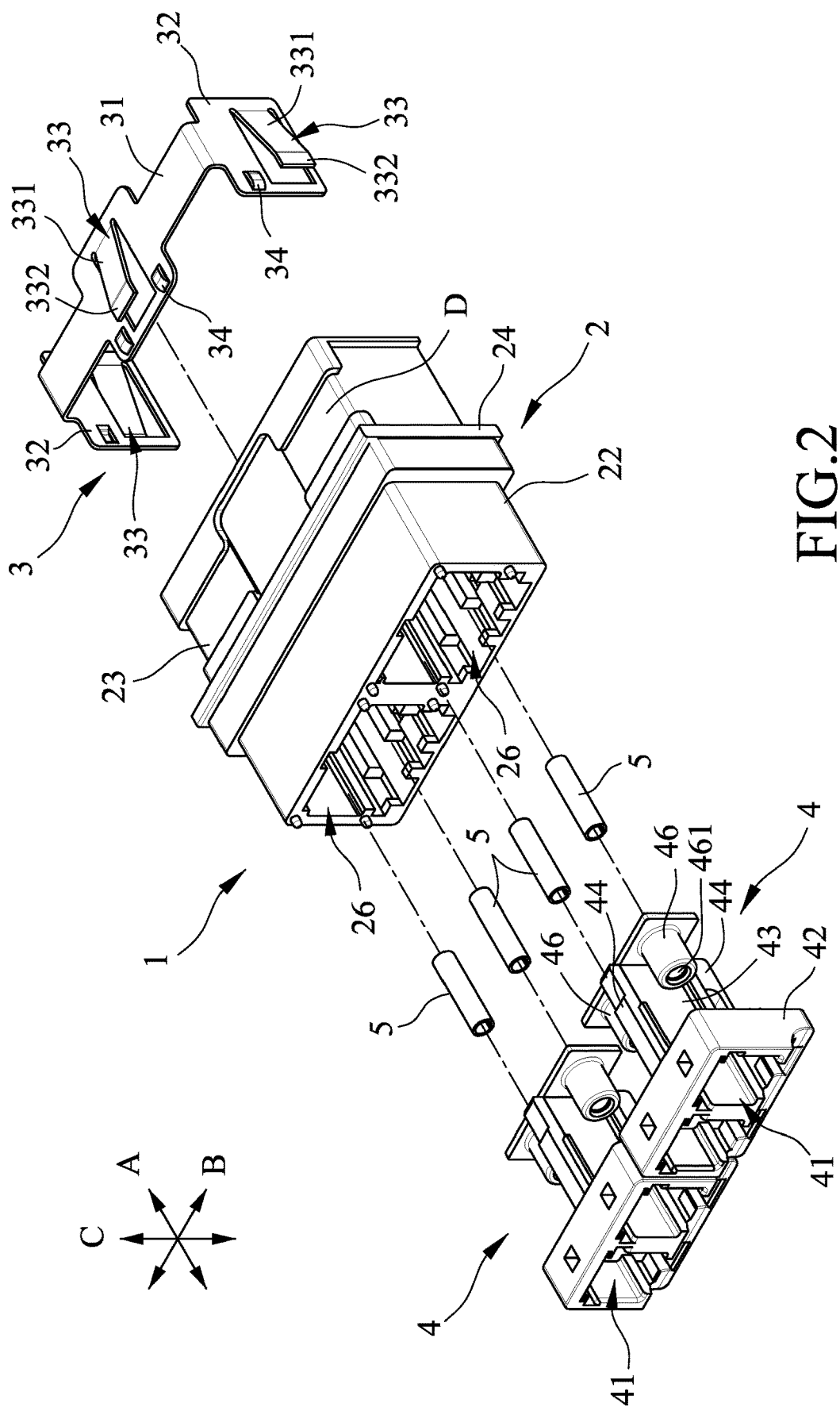
FIG. 2 is another exploded perspective view of the embodiment, illustrating the embodiment being inverted from the state in FIG. 1.

Referring to FIGS. 1 and 2, an embodiment of a fiber optic adapter 1 according to the present disclosure is adapted to be connected with a fiber optic connector (not shown). In the present embodiment, a front-back direction (A), a left-right direction (B), and an up-down direction (C) are defined perpendicular to each other, and the front-back direction (A) is parallel to a direction in which the fiber optic connector is inserted into the fiber optic adapter 1. It should be noted that, the aforementioned directions are used as reference fora better understanding of the structure of the embodiment, and should not be used to limit directionality of the embodiment for actual use and installation.

The fiber optic adapter 1 includes an outer casing 2, a position-limiting member 3 fixed to the outer casing 2, two mounting seats 4 disposed on the outer casing 2, four sleeves 5 inserted into the outer casing 2 along the front-back direction (A), and four shielding members 6 removably disposed on the mounting seats 4.

Figure 3:
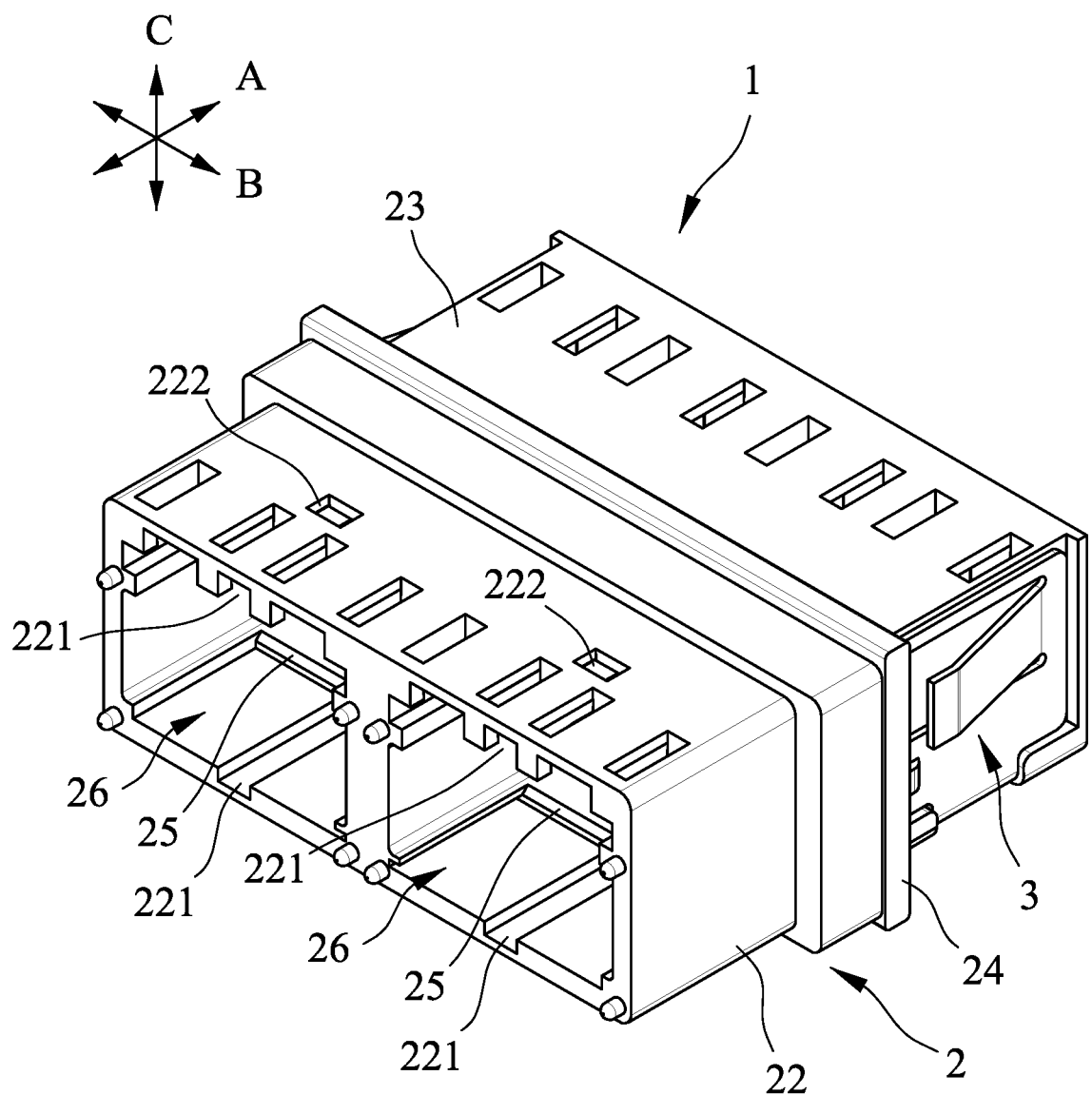
FIG. 3 is a perspective view of an outer casing and a position-limiting member of the embodiment.
Figure 4:
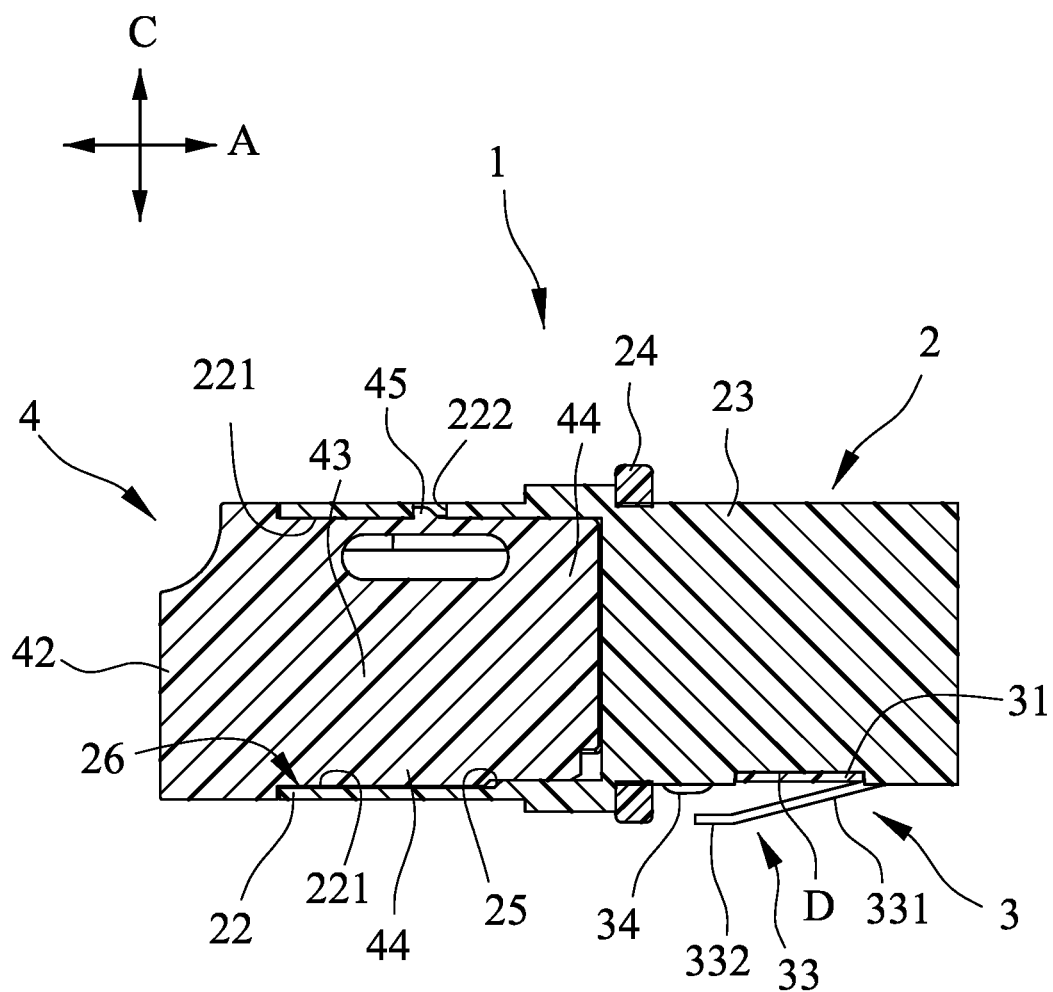
FIG. 4 is a sectional view, illustrating an installation slot and a mounting seat.
Figure 5:
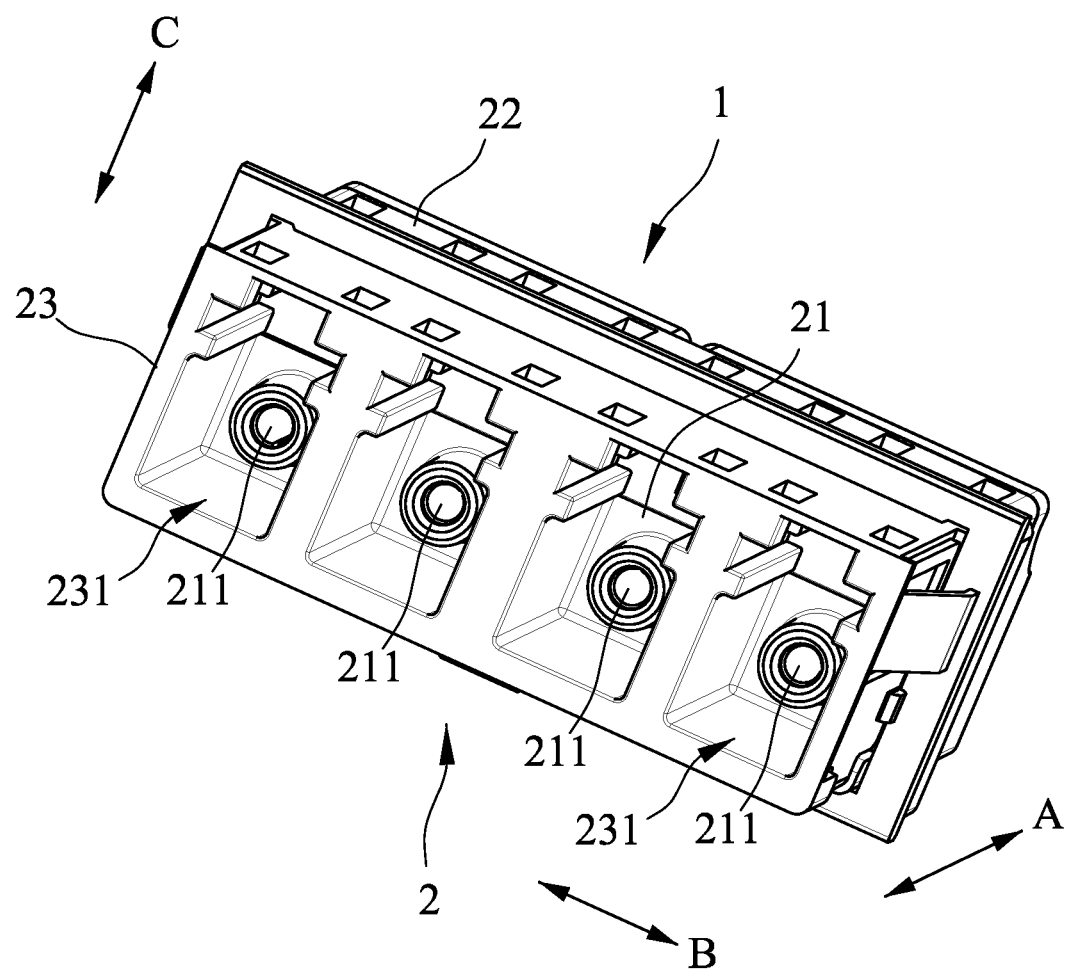
FIG. 5 is a perspective view of a casing portion of the outer casing.

Referring to FIGS. 3, 4, and 5, the outer casing 2 includes an inner wall portion 21 that extends along the left-right direction (B), a first casing portion 22 that is disposed in front of and connected to the inner wall portion 21, and that extends along the front-back direction (A), a second casing portion 23 that is disposed behind and connected to the inner wall portion 21, and that extends along the front-back direction (A), a positioning portion 24 sleeved on the second casing portion 23 and protruding outwardly from the second casing portion 23, and four block portions 25 disposed in the first casing portion 22 and spaced apart from each other along the left-right direction (B).

The inner wall portion 21 is formed with four connecting holes 211 extending therethrough along the front-back direction (A), and spaced apart from each other along the left-right direction (B). The first casing portion 22 and the inner wall portion 21 cooperatively define two installation slots 26 spaced apart along the left-right direction (B) and in spatial communication with the connecting holes 211. Specifically, each of the installation slots 26 corresponds in position to and is in spatial communication with two adjacent ones of the connecting holes 211.

The first casing portion 22 is formed with four slide grooves 221 that are each spatially communicated with a corresponding one of the installation slots 26, and that extend along the front-back direction (A), and two engaging slots 222 that extend along the up-down direction (C), and that are communicated spatially with the installation slots 26, respectively.

In the present embodiment, the slide grooves 221 are grouped in two pairs. Each pair of the slide grooves 221 are in spatial communication with a respective one of the installation slots 26, and are spaced apart from each other along the up-down direction (C). One of the slide grooves 221 of each pair is in spatial communication with a corresponding one of the engaging slots 222.

The second casing portion 23 and the inner wall portion 21 cooperatively define four insertion slots 231 that are arranged along the left-right direction (B) and that are spatially communicated with the connecting holes 211, respectively. Each of the insertion slots 231 extends along the front-back direction (A). The block portions 25 are disposed in the installation slots 26 in pairs (i.e., two of the block portions 25 are disposed in one of the installation slots 26, and the other two in the other one). The block portions 25 of each pair are disposed at opposite sides of a corresponding one of the slide grooves 221, and are opposite to each other along the left-right direction (B).

Figure 6:
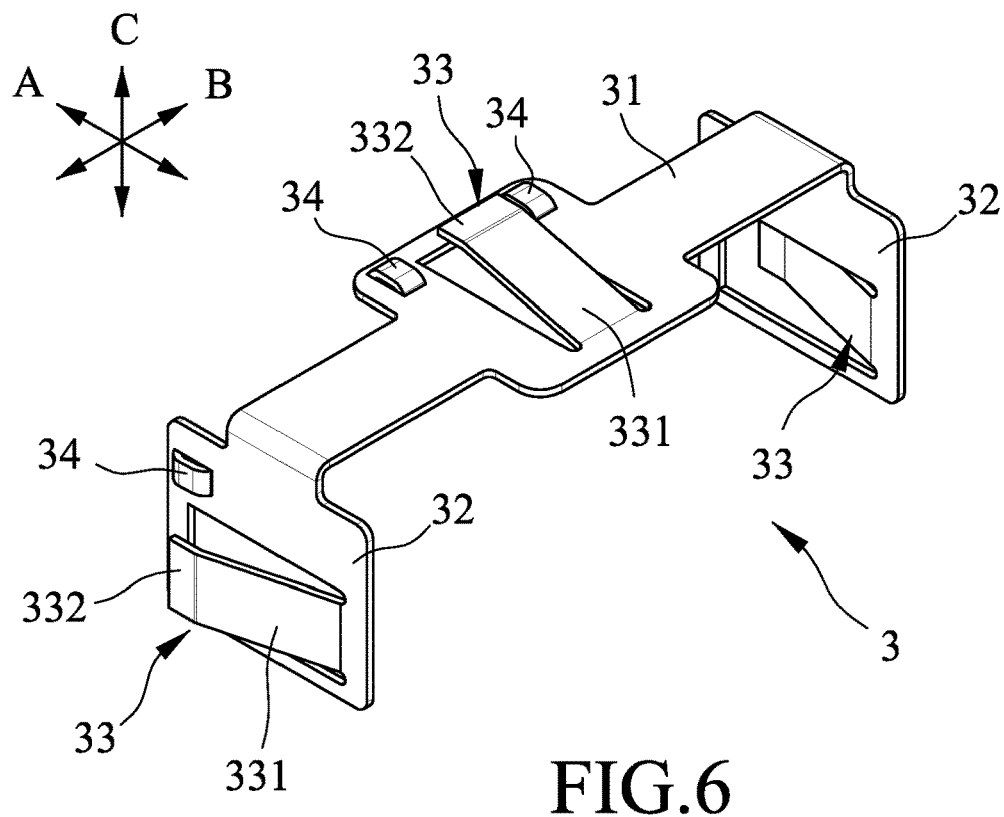
FIG. 6 is a perspective view of the position-limiting member.

Referring to FIGS. 2, 4, and 6, the position-limiting member 3 is fixed to the second casing portion 23, and the second casing portion 23 may be formed with a groove (D) on a surface thereof, as shown in FIG. 2, so as to allow the position-limiting member 3 to be mounted thereon, but is not limited thereto.

The position-limiting member 3 includes a main plate portion 31 that extends along the left-right direction (B) and that is substantially horizontal, two side plate portions 32 that extend respectively from left and right sides of the main plate portion 31 along the up-down direction (C), three resilient plate portions 33 that are disposed obliquely on the main plate portion 31 and the side plate portions 32, respectively, and four protruding portions 34 that protrude from the main plate portion 31 and the side plate portions 32.

Each of the resilient plate portions 33 extends in a direction oblique to the front-back direction (A), and has a first end 331 distal from the positioning portion 24, and a second end 332 opposite to the first end 331 and proximate to the positioning portion 24. For each of resilient plate portions 33, the first end 331 is connected to a corresponding one of the main plate portion 31 and the side plate portions 32, and the second end 332 is spaced apart from the corresponding one of the main plate portion 31 and the side plate portions 32 in one of the up-down direction (C) and the left-right direction (B).

In the present embodiment, the first end 331 of one of the resilient plate portions 33 that is disposed on the main plate portion 31 is connected to the main plate portion 31, and the second end 332 of the same is not connected to the main plate portion 31, and is spaced apart from the main plate portion 31 along the up-down direction (C). The first end 331 of each of the resilient plate portions 33 that are disposed on a respective one of the side plate portions 32 is connected to the respective one of the side plate portions 32, and the second end 332 of the same is spaced apart from the respective one of the side plate portions 32 along the left-right direction (B).

Two of the protruding portions 34 are disposed on the main plate portion 31, and are respectively disposed on opposite sides of a corresponding one of the resilient plate portions 33 along the left-right direction (B). The other two protruding portions 34 are disposed respectively on the side plate portions 32, and are disposed respectively on outer surfaces of the side plate portions 31, and are spaced apart from the resilient plate portions 33, respectively, along the left-right direction (B) and the up-down direction (C). Each of the protruding portions 34 is chamfered.

Referring to FIGS. 1, 2, and 4, the mounting seats 4 are inserted removably into the installation slots 26, respectively.

Each of the mounting seats 4 includes a seat portion 42, a connecting wall portion 43 that extends from the seat portion 42 along the front-back direction (A) toward the second casing portion 23 of the outer casing 2, two slider portions 44 that extend respectively from opposite sides of the connecting wall portion 43 along the up-down direction (C), a tenon portion 45 that protrudes from one of the slider portions 44 along the up-down direction (C), and that is engaged with a respective one of the engaging slots 222, and two insert portions 46 that are respectively connected to opposite sides of the connecting wall portion 43 which are opposite along the left-right direction (B), and that are spaced apart from the seat portion 42 along the left-right direction (B).

Each of the mounting seats 4 divides a respective one of the installation slots 26 into two sockets 41 that extend along the front-back direction (A), and that each are connected to the corresponding two of the connecting holes 211. Specifically, the seat portion 42 and the connecting wall portion 43 of each of the mounting seats 4 of the present embodiment divides the respective one of the installation slots 26 into the two sockets 41. The sockets 41 are provided for insertion of ends of a plurality of optical fiber connectors.

The slider portions 44 of each of the mounting seats 4 are disposed slidably in the corresponding slide grooves 221. Each of the slider portions 44 protrudes from aside of a corresponding one of the mounting seats 4 to form a stepped structure, so as to abut against a corresponding one of the block portions 25.

Each of the insert portions 46 is disposed in a respective one of the sockets 41, and is formed with an opening 461 that is registered with a respective one of the connecting holes 211 (see FIG. 5), and that is provided respectively for a corresponding one of the sleeves 5 to extend therethrough.

Figure 7:
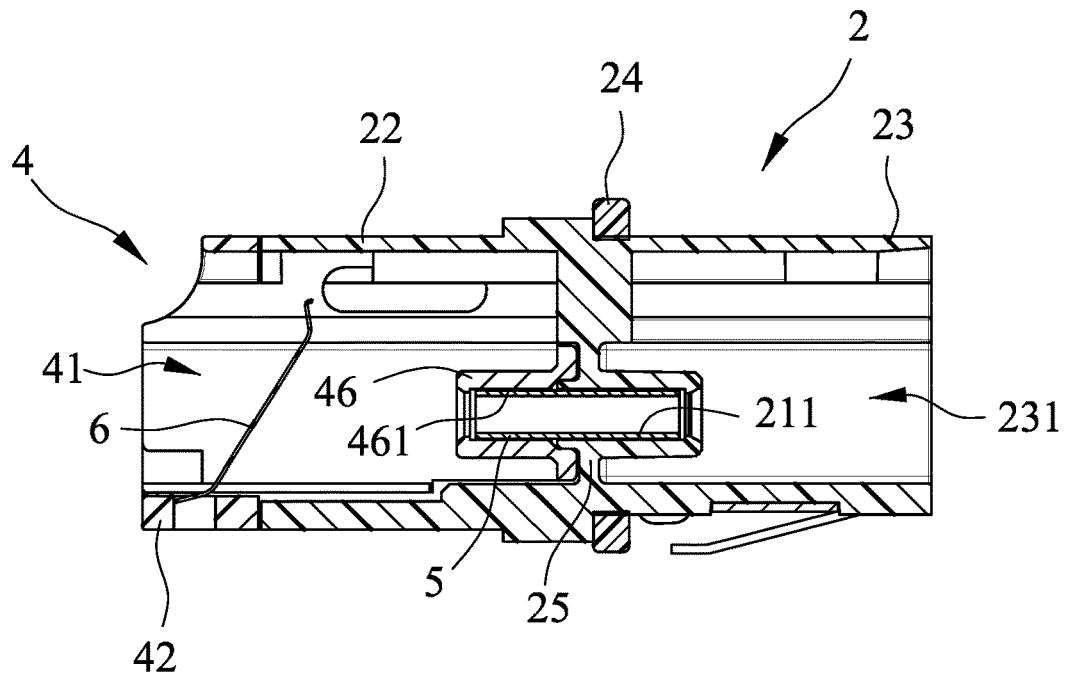
FIG. 7 is a sectional view, illustrating a sleeve, the mounting seat, and an inner wall portion and the outer casing.

Referring to FIGS. 1, 2, and 7, each of the sleeves 5 extends through the opening 461 of a respective one of the insert portions 46 of the mounting seats 4 and a respective one of the connecting holes 211, and has opposite ends extending respectively into a respective one of the sockets 41 and a respective one of the insertion slots 231.

The shielding members 6 are disposed removably in the sockets 41, respectively, for covering the sleeves 5, respectively. Each of the shielding members 6 is configured to be retained in a corresponding one of the seat portions 42 of the mounting seats 4 by a joint (e.g., snap-fit joint), so as to cover a front end of corresponding sleeve 5. However, disposition of the shielding members 6 may vary, and the shielding members 6 can be omitted in other embodiments of the disclosure.

Figure 8:
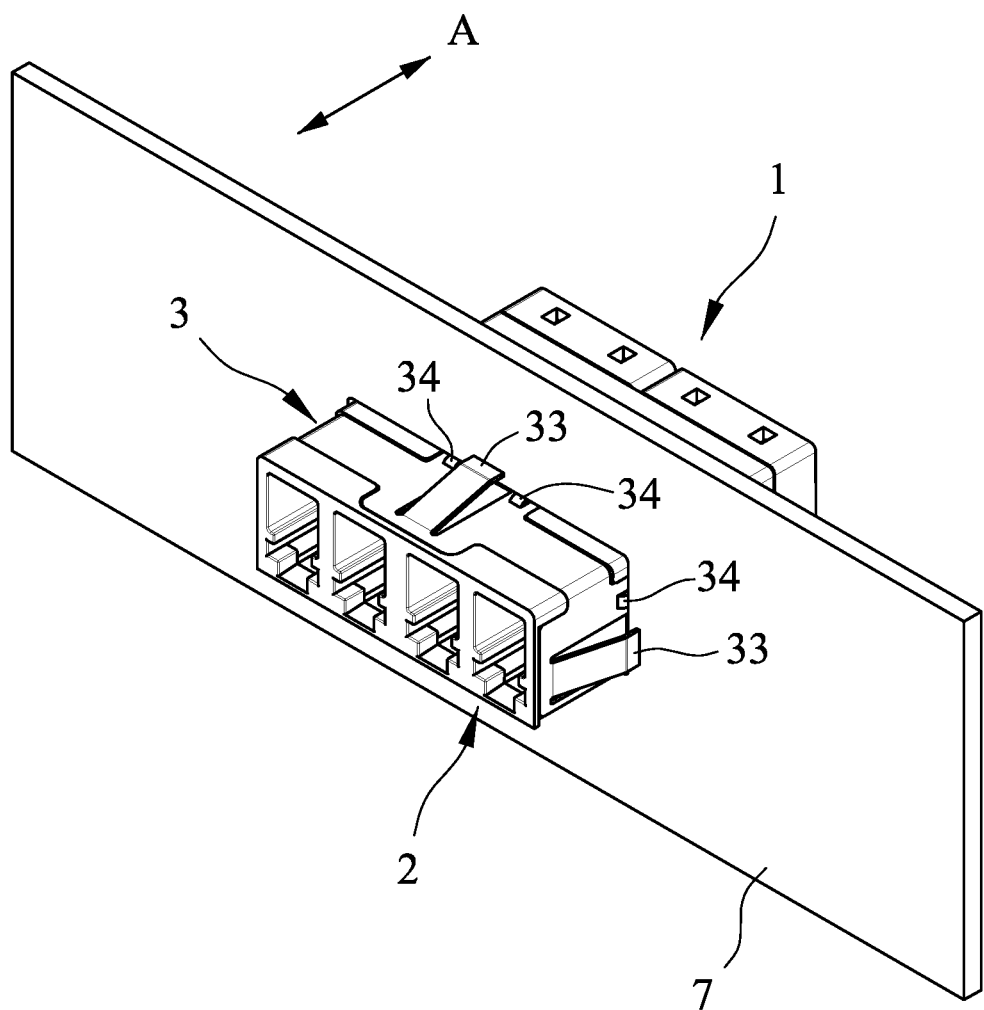
FIG. 8 is a perspective view, illustrating the embodiment being installed to a panel.
Figure 9:
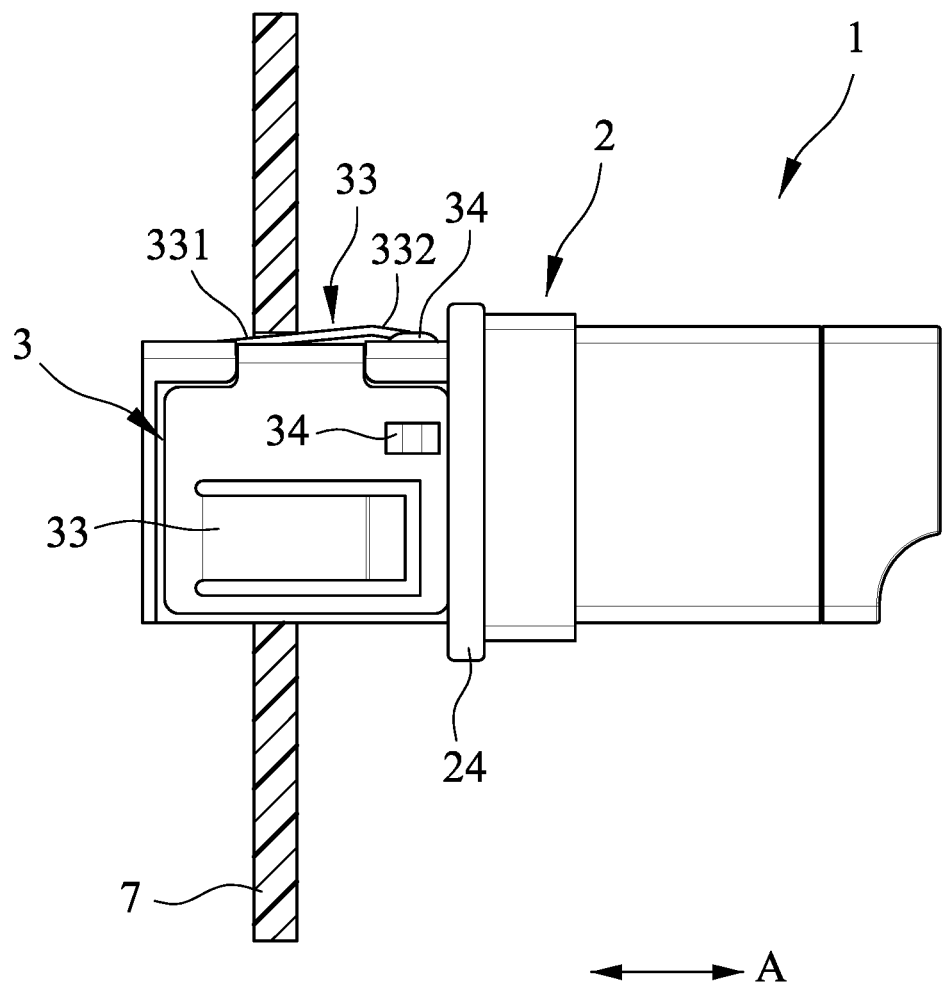
FIG. 9 is a sectional view, illustrating a state of the embodiment and the panel during an installation process.
Figure 10:
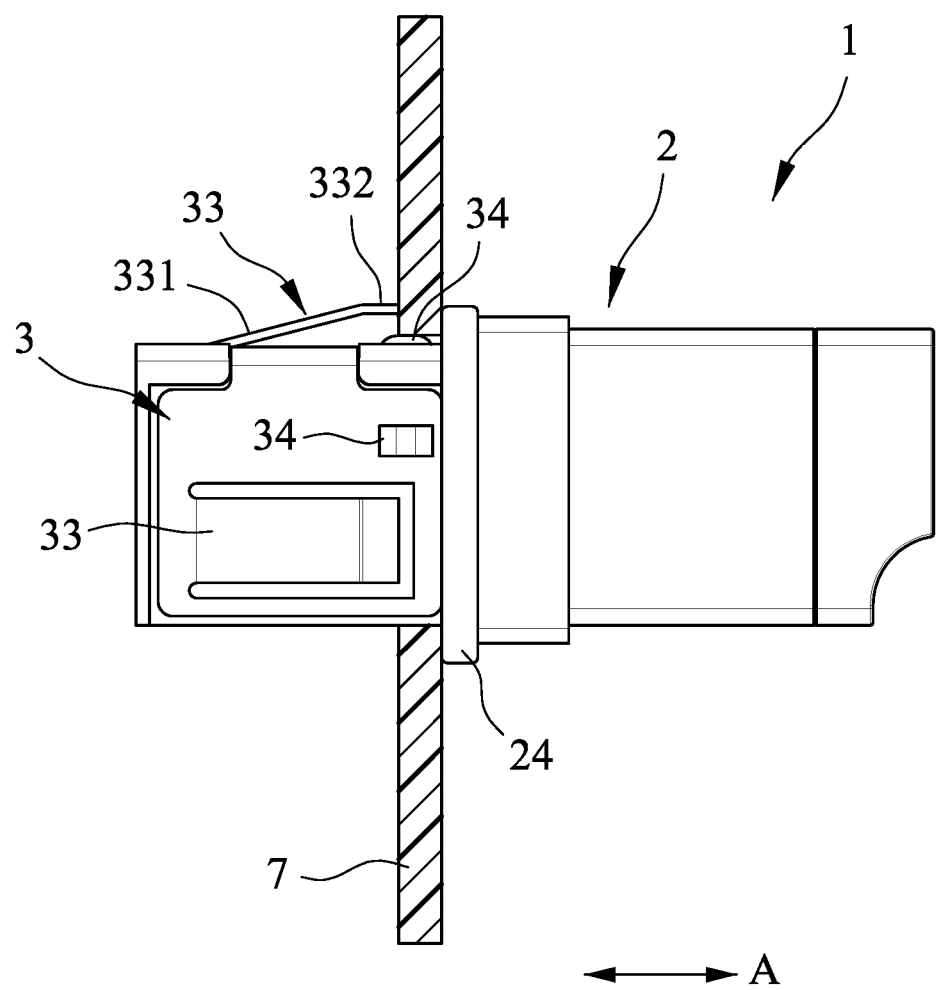
FIG. 10 is a view similar to FIG. 9, illustrating the embodiment and the panel when the installation process is complete.

Referring to FIGS. 8, 9, and 10, when the present embodiment is being installed to a panel 7, an end of the embodiment that is proximate to the resilient plate portions 33 of the position-limiting member 3 is moved through the panel 7 along the front-back direction (A). During the foregoing process, the resilient plate portions 33 are bent inwardly against its resilient force, and the panel 7 is then allowed to pass through each of the chamfered protruding portions 34.

Once the panel 7 passes past the resilient plate portions 33 of the position-limiting member 3, the resilient plate portions 33 return to their original positions, and cooperate with the positioning portion 24 to clamp the panel 7 therebetween, and the protruding portions 34 provide a positioning effect. By virtue of the above-mentioned configurations and mechanisms, the fiber optic adapter 1 is tightly fitted into the panel 7 without gaps such that the fiber optic adapter 1 is unlikely to become loosened and wobble relative to the panel 7, thereby enhancing the stability of the installation.

Referring to FIGS. 1 and 4, the mounting seats 4 are modularized. That is, when only two sockets 41 are required, it is only necessary to insert one mounting seat 4 into one installation slot 26 of the outer casing 2, which saves costs for manufacturing molds and is convenient for maintenance.

When mounting each of the mounting seats 4, positioning of each of the mounting seats 4 with respect to the left-right direction (B) is performed by placing two corresponding sliding blocks 44 into two corresponding slide grooves 221, respectively. Before the stepped one of the slider portions 44 of each of the mounting seats 4 contacts the corresponding one of the block portions 25, the tenon portion 45 of each of the mounting seats 4 is disposed proximate to but not engaged with the corresponding one of the engaging slots 222. When the stepped one of the slider portions 44 contacts the corresponding one of the block portions 25, the step-structured slider portion 44 is pushed upwardly by the corresponding block portion 25 such that the tenon portion 45 becomes engaged with the corresponding one of the engaging slots 222, thus achieving the positioning effect to ensure that each of the mounting seats 4 is not offset or misaligned.

In sum, by virtue of the resilient plate portions 33 and the protruding portions 34, the fiber optic adapter 1 of the present embodiment can be securely installed on the panel 7 without gaps, and is unlikely to be loosened or be moved relative to the panel 7. Additionally, the block portions 25 produce an effect for positioning the mounting seats 4, and thereby enhancing convenience of the installation. Accordingly, the purpose of the present disclosure can indeed be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic adapter comprising:
   an outer casing including
   an inner wall portion that is formed with a plurality of connecting holes extending along a front-back direction,
   a first casing portion that is disposed in front of and connected to said inner wall portion, and that extends along the front-back direction,
   a second casing portion that is disposed behind and connected to said inner wall portion, and that extends along the front-back direction, and
   a positioning portion that protrudes outwardly from said second casing portion, said connecting holes being spaced apart from each other in a left-right direction transverse to the front-back direction, said first casing portion and said inner wall portion cooperatively defining a plurality of installation slots that are arranged along the left-right direction and that are spatially communicated with said connecting holes, said second casing portion and said inner wall portion cooperatively defining a plurality of insertion slots that are arranged along the left-right direction and that are spatially communicated with said connecting holes, respectively;

a position-limiting member fixed to said second casing portion, said position-limiting member including a main plate portion that extends along the left-right direction, two side plate portions that extend respectively from left and right sides of said main plate portion in an up-down direction transverse to the front-back direction and the left-right direction, a plurality of resilient plate portions that are disposed obliquely on said main plate portion and said side plate portions, each of said resilient plate portions extending in a direction oblique to the front-back direction, and having a first end distal from said positioning portion, and a second end opposite to said first end and proximate to said positioning portion, said first end being connected to a corresponding one of said main plate portion and said side plate portions, said second end being spaced apart from the corresponding one of said main plate portion and said side plate portions in one of the up-down direction and the left-right direction, and a plurality of protruding portions that protrude from said main plate portion and said side plate portions; and a plurality of mounting seats inserted removably into said installation slots, each of said mounting seats dividing a corresponding one of said installation slots into two sockets that are connected correspondingly to two of said connecting holes.

2. The fiber optic adapter as claimed in claim 1, wherein said first casing portion is formed with a plurality of slide grooves each spatially communicated with a corresponding one said installation slots and extending in said front-back direction, each of said mounting seats including at least one slider portion that extends along the up-down direction, and that is disposed slidably within the corresponding one of said slide grooves.

3. The fiber optic adapter as claimed in claim 2, wherein each of said mounting seats further includes a seat portion, and a connecting wall portion that extends from said seat portion along the front-back direction toward said second casing portion, each of said mounting seats including two of said slider portions that protrude respectively from opposite sides of said connecting wall portion which are opposite along the up-down direction, each of said installation slots being spatially communicated with two of said slide grooves that are spaced apart along the up-down direction, and that are provided respectively for said slider portions of a corresponding one of said mounting seat to be inserted therein.

4. The fiber optic adapter as claimed in claim 3, further comprising a plurality of sleeves extending respectively through said connecting holes, each of said sleeves having opposite ends that extend respectively into a corresponding one of said insertion slots and a corresponding one of said sockets.

5. The fiber optic adapter as claimed in claim 4, wherein each of said mounting seats further includes two insert portions that are respectively connected to opposite sides of said connecting wall portion which are opposite along the left-right direction, and that are spaced apart from said seat portion along the left-right direction, said insert portions being disposed respectively within said sockets and each being formed with an opening registered with a respective one of said connecting holes, and being provided respectively for a corresponding one of said sleeves to extend therethrough.

6. The fiber optic adapter as claimed in claim 4, further comprising a plurality of shielding members disposed removably in said insertion slots, respectively, for covering said sleeves, respectively.

7. The fiber optic adapter as claimed in claim 3, wherein said outer casing further includes a plurality of block portions that are connected to said first casing portion and that are disposed respectively within said installation slots, each of said slider portions protruding from a side of a corresponding one of said mounting seats to form a stepped structure, and abutting against a corresponding one of said block portions.

8. The fiber optic adapter as claimed in claim 3, wherein said first casing portion is formed with a plurality of engaging slots extending along the up-down direction, and communicated spatially with said installation slots, respectively, each of said mounting seats further including a tenon portion that protrudes from one of said slider portions along the up-down direction, and that is engaged with a respective one of said engaging slots.

* * * * *